United States Patent
Smith et al.

(10) Patent No.: US 10,924,555 B2
(45) Date of Patent: Feb. 16, 2021

(54) TRANSACTION RESOURCES FOR STATELESS MESSAGE PROTOCOL

(71) Applicant: Intel Corporation, Santa Clara, CA (US)

(72) Inventors: Ned M. Smith, Beaverton, OR (US); Gregory Burns, Seattle, WA (US); Ravi Subramaniam, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/473,597

(22) PCT Filed: Jan. 25, 2017

(86) PCT No.: PCT/US2017/014915
§ 371 (c)(1),
(2) Date: Jun. 25, 2019

(87) PCT Pub. No.: WO2018/140006
PCT Pub. Date: Aug. 2, 2018

(65) Prior Publication Data
US 2020/0153912 A1    May 14, 2020

(51) Int. Cl.
*H04L 29/08*    (2006.01)
*G06F 9/46*    (2006.01)
*H04L 29/06*    (2006.01)

(52) U.S. Cl.
CPC ............ *H04L 67/142* (2013.01); *G06F 9/466* (2013.01); *H04L 67/40* (2013.01)

(58) Field of Classification Search
CPC ........ H04L 67/142; H04L 67/40; G06F 9/466
(Continued)

(56) References Cited

U.S. PATENT DOCUMENTS

| 7,206,805 B1* | 4/2007 | McLaughlin, Jr. ..... G06F 9/466 707/999.01 |
| 2004/0236989 A1* | 11/2004 | Pavlik ..................... H04L 67/10 714/15 |

(Continued)

FOREIGN PATENT DOCUMENTS

| WO | WO-2016077716 A1 | 5/2016 |
| WO | WO-2018140006 A1 | 8/2018 |

OTHER PUBLICATIONS

"International Application Serial No. PCT/US2017/014915, International Search Report dated Apr. 26, 2017", 5 pgs.

(Continued)

*Primary Examiner* — Nicholas R Taylor
*Assistant Examiner* — Chong G Kim
(74) *Attorney, Agent, or Firm* — Schwegman Lundberg & Woessner, P.A.

(57) ABSTRACT

A communications device, such as an Internet-of-Things device, includes an entity resource to originate or consume data, and core resources to facilitate stateless messaging with a remote device, with the messaging being associated with the entity resource. Transaction resources are provided to manage a transaction with the remote device. The transaction includes a sequence of messages associated with the entity resource. The transaction resources include a transaction state machine to represent a current intra-transactional ephemeral state from among a plurality of intra-transactional ephemeral states representing progression of the transaction, a commit handler to institute a persistent state change related to the entity resource in response to a successful completion of the transaction, and a transaction communicator to conduct intra-transaction communications via the core resources directed to corresponding transactional resources of the remote device.

25 Claims, 12 Drawing Sheets

(58) Field of Classification Search
USPC .......................................................... 709/227
See application file for complete search history.

(56) References Cited

U.S. PATENT DOCUMENTS

| | | |
|---|---|---|
| 2015/0055640 A1 | 2/2015 | Wang et al. |
| 2015/0381776 A1 | 12/2015 | Seed et al. |
| 2019/0007928 A1* | 1/2019 | Di Girolamo .......... H04W 4/08 |
| 2019/0238617 A1* | 8/2019 | Novo Diaz ......... H04L 67/1076 |

OTHER PUBLICATIONS

"International Application Serial No. PCT/US2017/014915, Written Opinion dated Apr. 26, 2017", 10 pgs.
Kumar, et al., "Profiling of DTLS for CoAP-based IoT Applications; draft-keoh-dice-dtls-profile-iot-00.txt", Profiling of DTLS for COAP-Based IOT Applications; Draft-Keoh-Dice-DTLS-Profile-IOT-00. TXT, Internet Engineering Task Force, (Nov. 6, 2013), 1-15.
Pautasso, et al., "RESTful Web service composition with BPEL for REST", Data & Knowledge Engineering, vol. 68, No. 9, (Sep. 1, 2009), 851-866.

\* cited by examiner

TRANSACTION RESOURCES FOR STATELESS MESSAGE PROTOCOL

CLAIM OF PRIORITY

This application is a U.S. National Stage Application under 35 U.S.C. 371 from International Application No. PCT/US2017/014915, filed Jan. 25, 2017, published as WO 2018/140006, which is incorporated herein by reference in its entirety.

TECHNICAL FIELD

Embodiments described herein generally relate to data communications and, more particularly, to facilitating low-latency transactions in communication systems utilizing stateless messaging protocols.

BACKGROUND

The Internet of Things (IoT) is the networking of physical objects, such as sensors and actuators, vehicles, building automation systems, information devices, and other items, which are embedded with electronics, software, and network connectivity that enables these objects to collect and exchange data. IoT as a new communications and interaction paradigm is rapidly developing to offer many new and useful features in applications such as smart home, smart city, industrial control, and smart transportation.

IoTivity is an IoT framework that implements Open Connectivity Foundation (OCF) standards to ensure interoperability of IoT devices. IoTivity features a declarative model for describing resource interactions among IoT devices. It is well-suited for using a representational state transfer (RESTful) approach to distributed computing. RESTful behavior allows servers, or devices responding to messages, to remain stateless as a strategy for improved scalability. However, some interactions involve maintaining the protocol state, such as provisioning devices into a network, establishing or adjusting operational settings or polices, exchanging credentials, and the like. An incomplete configuration leaves the device in an undefined operational state where either the configuration is to be completed, or rolled back to a previous state.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
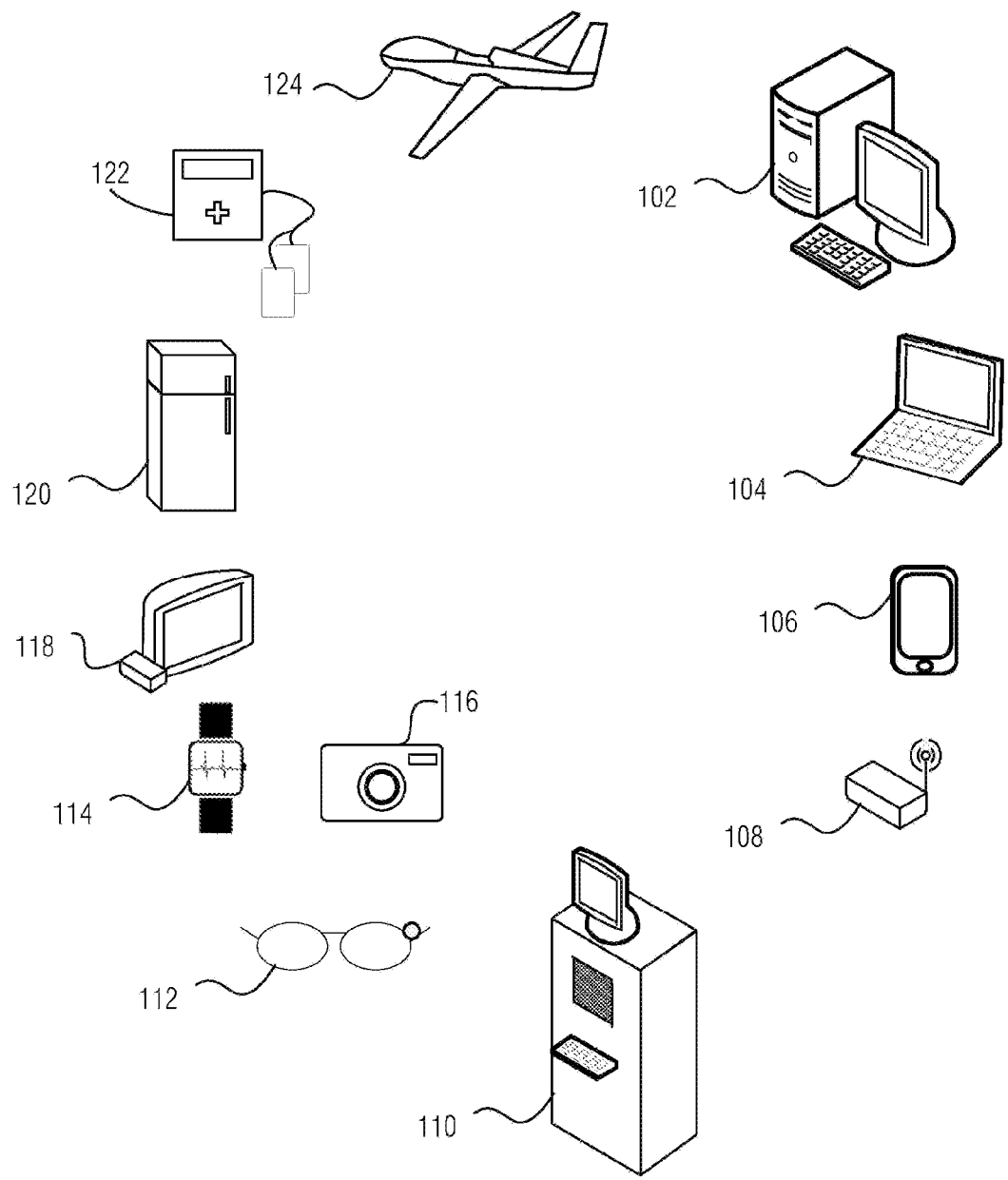
FIG. 1 is a high-level diagram illustrating examples of various types of computing platforms, including IoT platforms, on which aspects of the subject matter may be implemented according to some embodiments.

Aspects of the embodiments are directed to communications between devices using stateless protocols. In general, a stateless protocol is a communications protocol that treats each request as an independent transaction that is unrelated to any previous request so that the communication is composed of independent pairs of request and response. A stateless protocol does not require the server, or responsive entity, to retain session information or status about each communications partner for the duration of multiple requests. For ease of illustration, various examples are described herein in the context of IoTivity protocols, and RESTful architecture. However, it will be understood that principles of the embodiments may be applicable in various other contexts or applications, particularly those utilizing a stateless communications paradigm.

According to some aspects of the embodiments, each transaction, which in the present context, refers to a series of exchanged messages between entities to achieve a particular result, may involve a sequence of messages to be communicated. Accordingly, different states may be maintained by an initiating entity, responsive entity, or both. Example use cases involving sequences of operations include, without limitation, key exchange protocols, provisioning, setup and manageability, key and certificate management, access policy provisioning, on-boarding, and the like.

In a conventional RESTful paradigm, multi-state transactions invite various challenges. For one, there is no effective coordination between each initiator and responder. There is no guarantee the protocol will progress as intended, and there is no provision for data cleanup if the protocol aborts.

To facilitate management of such transactions, a transactional resource is instantiated for each transaction that coordinates multiple RESTful message exchanges. The transaction resource is discoverable by other devices; hence they may interact with the resource—effectively invoking the transaction.

In some examples, the various message exchanges involved in a given transaction are modeled using a resource property state machine that specifies the sequence in which the various RESTful messages may be applied. Message contents or protocol data units (PDUs) are defined as resources such that RESTful commands (e.g. GET, PUT, POST, etc.) may be applied to effect the information exchange. By applying OBSERVE over the transaction resource's state property it is possible for both communicating entities to determine when it is appropriate to continue to the next step (even if connection is lost/re-established) or to perform cleanup if the transaction aborts or commits, for example.

Advantageously, the use of transaction resources enable IoT applications to implement transactional interaction protocols such as device provisioning, key exchange, multiphase commit and the like, using a declarative object model (such as OCF/IoTivity).

In various examples, the transaction resource allows an IoT framework layer to optimize message delivery using any available messaging methodology (e.g. pub/sub, req/resp, event/notify etc.) using MQ Telemetry Transport (MQTT), Extensible Messaging and Presence Protocol (XMPP), Extensible Markup Language (XML), Constrained Application Protocol (COAP), Data Distribution Service (DDS) and others may be used by the framework layer.

FIG. 1 is a high-level diagram illustrating some examples of various types of computing platforms that may be incorporated in IoT devices. The computing platforms include servers or personal computers, such as PC 102, laptop 104, smartphone/tablet 106, and the like. Other types of information devices, such as networking appliance 108, which represents a switch, router, access point, etc., are computing platforms that are also contemplated. Industrial equipment 110, such as control systems, automated tooling, motor/robotics controls, programmable logic controllers, are also types of computing platforms on which aspects of the embodiments may be implemented. Computing platforms may also be implemented as consumer-electronic devices, such as smart glasses 112, smartwatch 114, digital camera 116, and media device 118, such as a set-top box as depicted, audio playback system, etc. Appliance 120 may also contain a computing system such as, for instance, an Internet-of-Things (IoT) node. Medical device 122 may contain an embedded computing platform. Likewise vehicle 124 may also contain one or more computing platforms. Each computing platform may include a processor-based system, e.g., a machine capable of executing instructions (sequential or otherwise) that specify actions to be taken by that machine.

Figure 2:
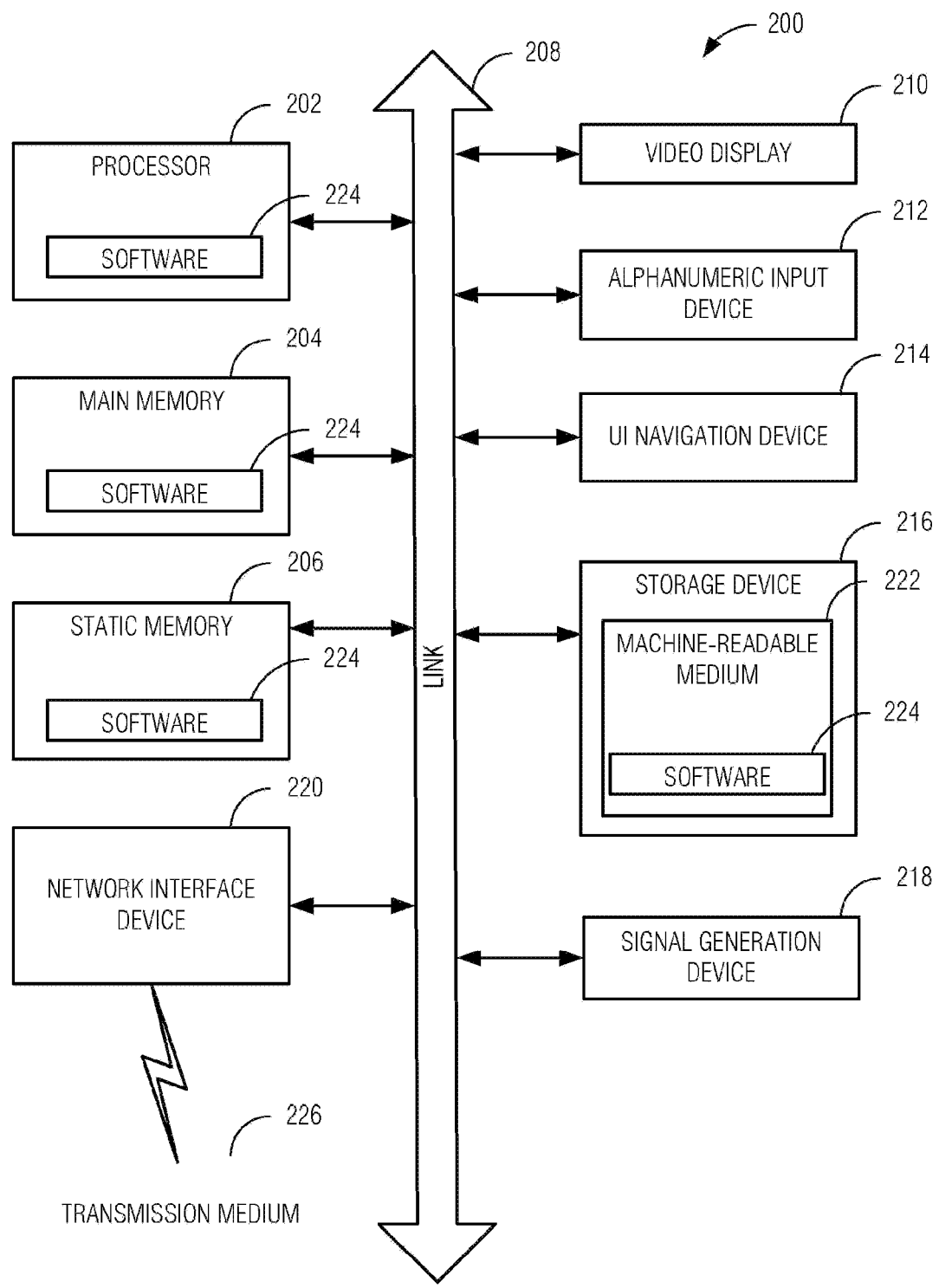
FIG. 2 is a block diagram illustrating a computer system in the example form of a general-purpose machine.

FIG. 2 is a block diagram illustrating a computer system 200 in the example form of a general-purpose machine. In certain embodiments, programming of the computer system 200 according to one or more particular algorithms produces a special-purpose machine upon execution of that programming. In a networked deployment, the computer system may operate in the capacity of either a server or a client machine in server-client network environments, or it may act as a peer machine in peer-to-peer (or distributed) network environments. As will be discussed in some examples below, a device may operate in a client mode or a server mode in alternating fashion, depending on whether it is an initiator, or responder, to a transaction or message.

Example computer system 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computer system 200 may further include a video display unit 210, an alphanumeric input device 212 (e.g., a keyboard), and a user interface (UI) navigation device 214 (e.g., a mouse). The video display unit, according to various embodiments, may include a complex, user-interactive display, or a simple numerical or alpha-numerical display. In one embodiment, the video display unit 210, input device 212 and UI navigation device 214 are incorporated into a touch screen display. The computer system 200 may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computer system 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3A:
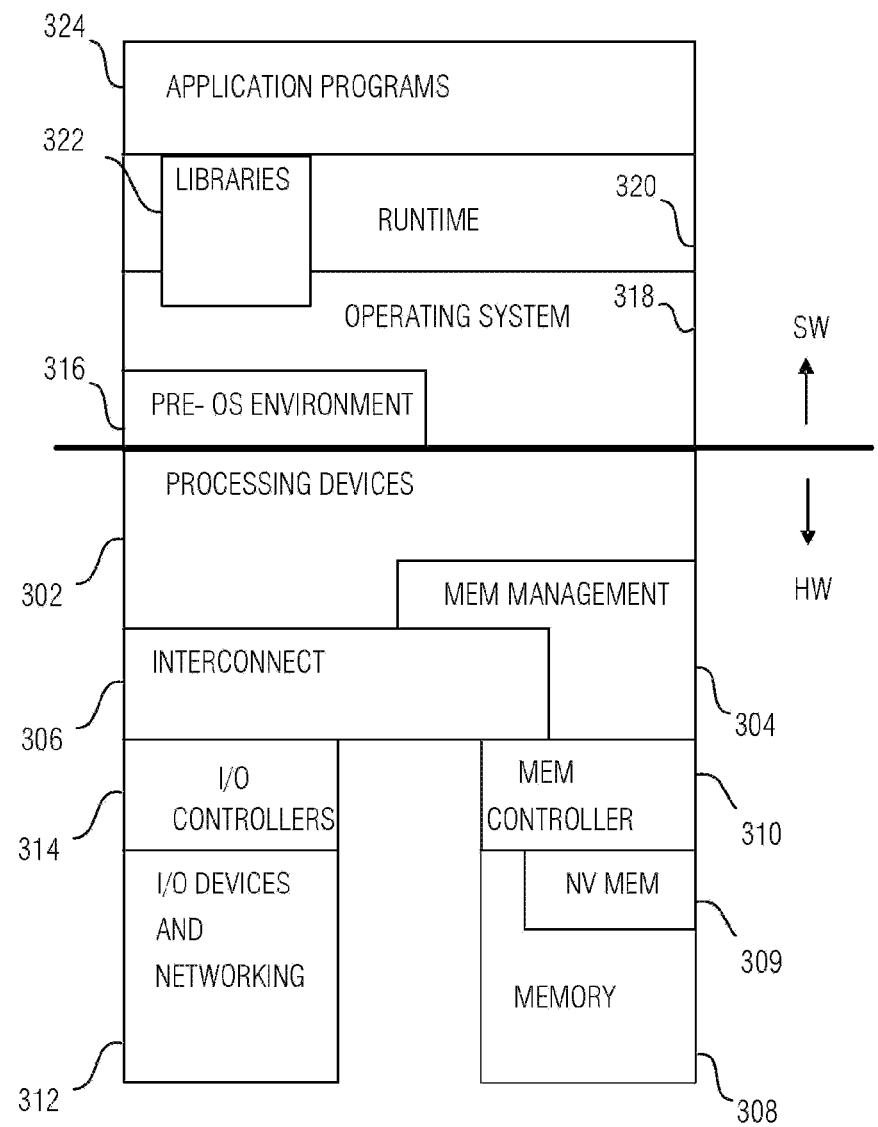
FIG. 3A is a diagram illustrating an exemplary hardware and software architecture of a computing device such as the one depicted in FIG. 2, in which various interfaces between hardware components and software components are shown.

FIG. 3A is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 3B:
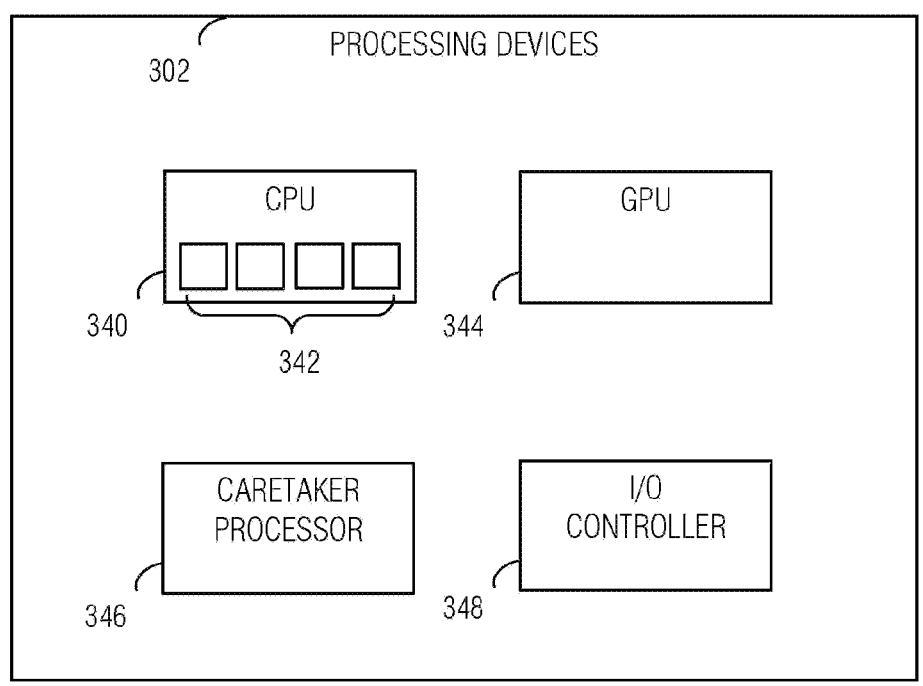
FIG. 3B is a block diagram illustrating examples of processing devices that may be implemented on a computing device according to some embodiments.

FIG. 3B is a block diagram illustrating processing devices 302 according to some embodiments. In one embodiment, two or more of processing devices 302 depicted are formed on a common semiconductor substrate. CPU 340 may contain one or more processing cores 342, each of which has one or more arithmetic logic units (ALU), instruction fetch unit, instruction decode unit, control unit, registers, data stack pointer, program counter, and other essential components according to the particular architecture of the processor. As an illustrative example, CPU 340 may be a x86-type of processor. Processing devices 302 may also include a graphics processing unit (GPU) 344. In these embodiments, GPU 344 may be a specialized co-processor that offloads certain computationally-intensive operations, particularly those associated with graphics rendering, from CPU 340. Notably, CPU 340 and GPU 344 generally work collaboratively, sharing access to memory resources, I/O channels, etc.

Processing devices 302 may also include caretaker processor 346 in some embodiments. Caretaker processor 346 generally does not participate in the processing work to carry out software code as CPU 340 and GPU 344 do. In some embodiments, caretaker processor 346 does not share memory space with CPU 340 and GPU 344, and is therefore not arranged to execute operating system or application programs. Instead, caretaker processor 346 may execute dedicated firmware that supports the technical workings of CPU 340, GPU 344, and other components of the computer system. In some embodiments, caretaker processor is implemented as a microcontroller device, which may be physically present on the same integrated circuit die as CPU 340, or may be present on a distinct integrated circuit die. Caretaker processor 346 may also include a dedicated set of I/O facilities to enable it to communicate with external entities. In one type of embodiment, caretaker processor 346 is implemented using a manageability engine (ME) or platform security processor (PSP). Input/output (I/O) controller 348 coordinates information flow between the various processing devices 340, 344, 346, as well as with external circuitry, such as a system interconnect.

Figure 3C:
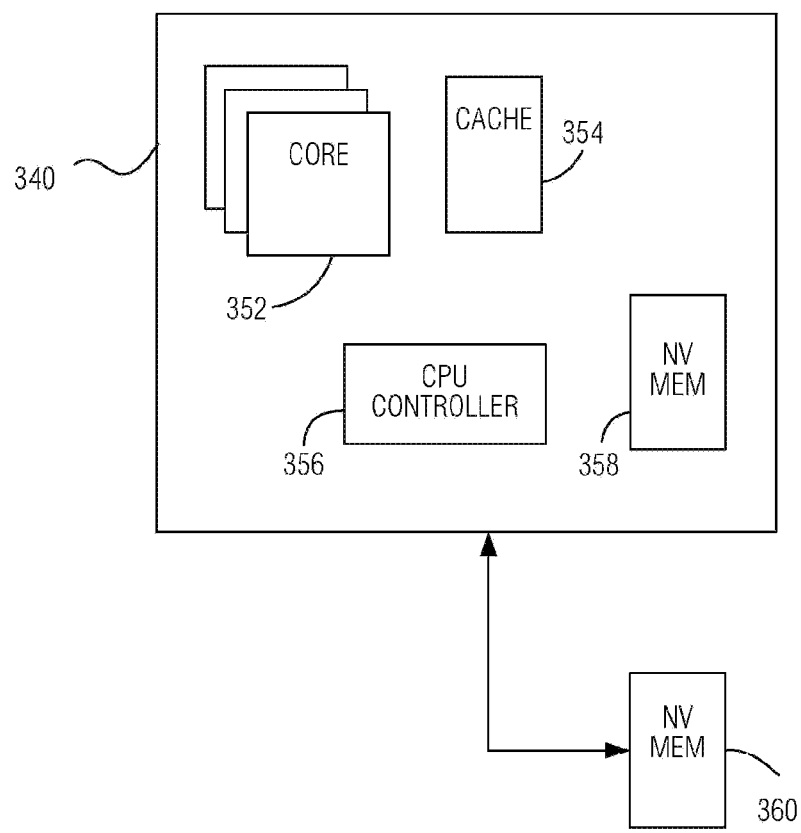
FIG. 3C is a block diagram illustrating example components of a processing device, according to various embodiments.

FIG. 3C is a block diagram illustrating example components of CPU 340 according to various embodiments. As depicted, CPU 340 includes one or more cores 352, cache 354, and CPU controller 356, which coordinates interoperation and tasking of the core(s) 352, as well as providing an interface to facilitate data flow between the various internal components of CPU 340, and with external components such as a memory bus or system interconnect. In one embodiment, all of the example components of CPU 340 are formed on a common semiconductor substrate.

CPU 340 includes non-volatile memory 358 (e.g., flash, EEPROM, etc.) for storing certain portions of foundational code, such as an initialization engine, and microcode. Also, CPU 340 may be interfaced with an external (e.g., formed on a separate IC) non-volatile memory device 360 that stores foundational code that is launched by the initialization engine, such as system BIOS or UEFI code.

Examples, as described herein, may include, or may operate on, logic or a number of components, circuits, modules, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

According to various examples, an IoT devices are compliant with standards promulgated by the Open Connectivity Foundation, such as the Open Interconnect Consortium (OIC) Core Specification V1.1.1 (2016), for example. The Core Specification documents specify the Framework, i.e., the OCF core architecture, interfaces, protocols and services to enable OCF profiles implementation for IoT usages and ecosystems. As a general principle, entities in the physical world (e.g., temperature sensor, an electric light or a home appliance) are represented as resources. Interactions with an entity are achieved through its resource representations using operations that adhere to Representational State Transfer (REST) architectural style, e.g., RESTful interactions.

The architecture defines the overall structure of the Framework as an information system and the interrelationships of the entities that make up OCF. Entities are exposed as resources, with their unique identifiers (URIs) and support interfaces that enable RESTful operations on the resources. Every RESTful operation has an initiator of the operation (also referred to as the client role) and a responder to the operation (also referred to as the server role).

In the framework, the notion of the client and server is realized through roles. Any device may act as a client and initiate a RESTful operation on any device acting as a server. Likewise, any device that exposes entities as resources acts as a server. Conformant to the REST architectural style, each RESTful operation contains all the information to represent the context of the interaction and is driven using a small set of generic operations, e.g., Create, Read, Update, Delete, Notify (CRUDN), which include representations of resources.

The architecture is organized conceptually into three major aspects that provide overall separation of concern: resource model, RESTful operations and abstractions. The resource model provides the abstractions and concepts to logically model, and logically operate on the application and its environment. The core resource model is common and agnostic to any specific application domain such as smart home, industrial or automotive. For example, the resource model defines a resource which abstracts an entity and the representation of a resource maps the entity's state. Other resource model concepts may be used to model other aspects, for example behavior. The generic CRUDN operations are defined using the RESTful paradigm to model the interactions with a resource in a protocol and technology agnostic way.

The abstractions in the resource model and the RESTful operations are mapped to concrete elements using abstraction primitives. An entity handler is used to map an entity to a resource and connectivity abstraction primitives are used to map logical RESTful operations to data connectivity protocols or technologies. Entity handlers may also be used to map resources to entities that are reached over protocols that are not natively supported by OCF.

Figure 4A:
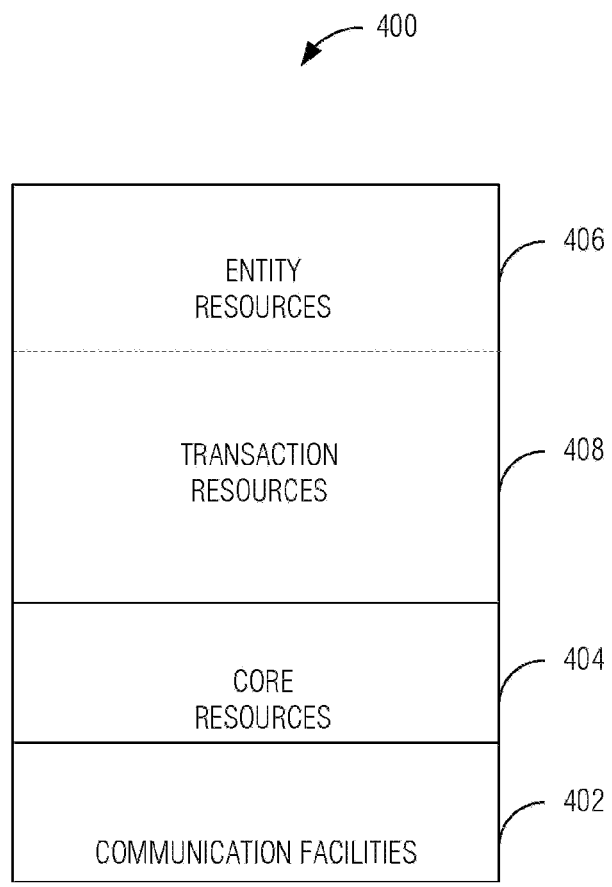
FIG. 4A is a diagram illustrating an example IoT device architecture according to some embodiments, at a high level of abstraction.

FIG. 4A is a diagram illustrating an example IoT device architecture according to some embodiments, at a high level of abstraction. As illustrated, IoT device 400 includes communication facilities 402, core resources 404, entity resource 406, and transaction resources 408. Communication facilities 402 include hardware, and instructions executable on the hardware, that facilitate message exchange between device 400 and a peer device. Communication facilities 402 may include wireless or wired networking architecture (e.g., WiFi, Long-term Evolution (LTE), personal-area networking (PAN) such as Bluetooth, home-area networking such as Zigbee, and the like, as well as wired networking architecture such as Ethernet, Fieldbus, or the like, along with corresponding firmware and software drivers to facilitate the hardware's operation).

Core resources 404 include a set of defined resources to enable functional interactions such as resource discovery, device management, GET operation, PUT operation, OBSERVE operation, and the like. Core resources 404 may include a resource access manager that implements various security policies such as firewall functionality.

Entity resources 406 represents one or more data sources or data sinks (e.g., data originators or data consumers) such as a data storage device, data capture device, computing platform, sensor, actuator, or the like. In general, entity resources 406 include the operability that is sought when device 400 is accessed. Entity resources 406 may also include an application that seeks to obtain information from, or send information or commands to, an entity resource of a peer device.

Figure 4B:
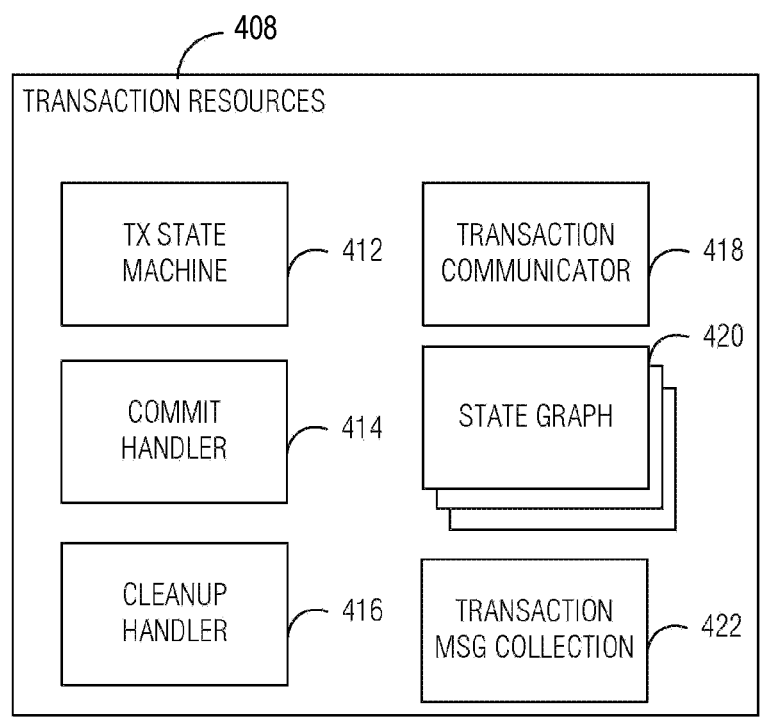
FIG. 4B illustrates an example set of components that are included in transaction resources according to some embodiments.

According to some embodiments, transaction resources 408 include resources to handle transactions in which sequences of multiple related messages may be communicated to achieve a common objective or result, with one or more intermediate state changes taking place between the initiation and conclusion of a given transaction. FIG. 4B illustrates an example set of components that are included in transaction resources 408 according to some embodiments. Transaction resources 408 include a transaction state machine 412 to represent the current intra-transactional ephemeral state, a commit handler 414 to institute a persistent state change at the successful conclusion of a transaction, and a cleanup handler 416 to abort a transaction and clear out any pre-committed intermediate state changes in response to a transaction failure. Also, transaction communicator 418 is included to conduct intra-transaction communications with the transaction resources of a peer device.

In a related embodiment, transaction resources 408 include one or more discoverable state graph data structures 420, discoverable by peer devices, each of which represents the process flow of a corresponding transaction type, including messages and allowed intra-transaction states, which are supported by IoT device 400. In another related embodiment, transaction resources 408 include a collection 422 of transaction message resources that are supported.

As an example, transaction resources 408 may include the following properties and attributes:
Resource Attributes
  Resource Type: "rt"="ocf.tx.<tx_name>
  Discoverable: YES—allows a peer device to initiate transaction
  Interfaces: "baseline"—CR—N(observe)
Resource Properties
  "txs"—current state of the transaction
  "txg"—graph defining reachable states and transitions
  "txi"—Tx instance identifier
  "txh"—hash of Tx messages exchanged
  "txc"—Collection resource with references to transaction message resources.

In an example, intra-transaction state changes are achieved through the exchange of RESTful messages between one or more peer devices. Message encoding may vary for the various states defined in a given transaction. Hence, it is possible for an IoT core layer to optimize message delivery (e.g., mixing multiple messaging models such as request/response, pub/sub, event/notify etc.) without impacting the transaction resources or the logic contained in the transaction communicator.

Figure 5:
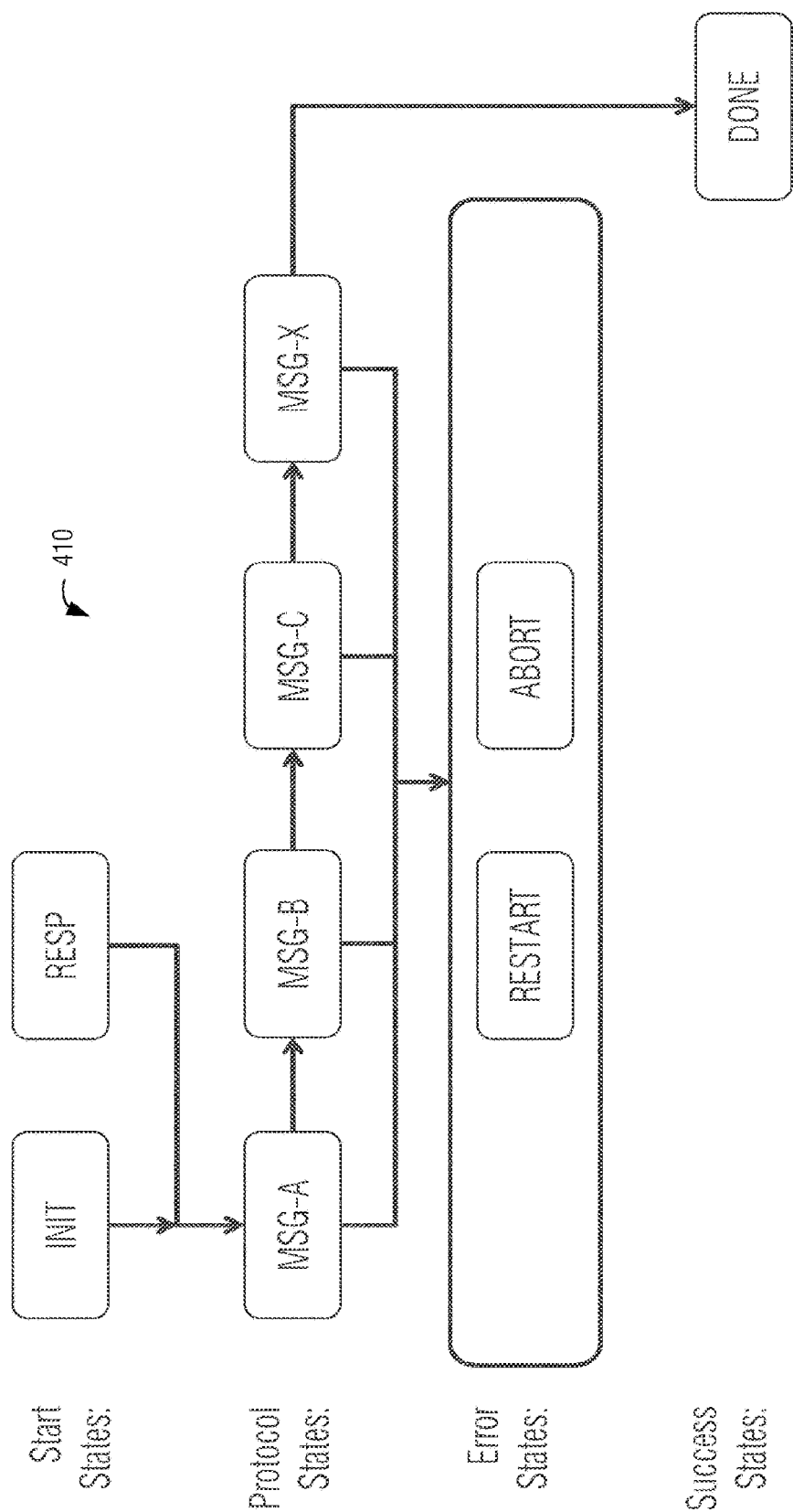
FIG. 5 is a diagram illustrating an example state graph data structures according to an embodiment.

FIG. 5 is a diagram illustrating an example state graph data structures 420 according to an embodiment. As depicted, start states may include initiation INIT and response RESP states. Protocol states to carry out a transaction may include messages MSG-A-MSG-X as shown. Error states include RESTART and ABORT states, and a success state includes DONE.

To ensure progress is achieved the protocol state dependencies are non-circular in this example. The responder may observe the state property of the Initiator's Tx resource specifying the state value(s) that trigger notification responses. For instance, observing the MSG-B state subsequent to posting a MSG-A message would allow the Responder to take an extended period of time processing MSG-A. The initiator may return to doing other tasks, or going to sleep, knowing that when the responder is ready to post MSG-B it will receive a notification to wake up or listen for activity from the Responder.

Notifications may also be used to signal when it is appropriate to free computing resources allocated to perform the transaction. For example, DONE or ABORT notification might cause the device to free memory used to contain message buffers and temporary files. Whatever the reason for observation of a state property, the transaction communicator may ensure a valid sequence of messages is processed.

Figure 6:
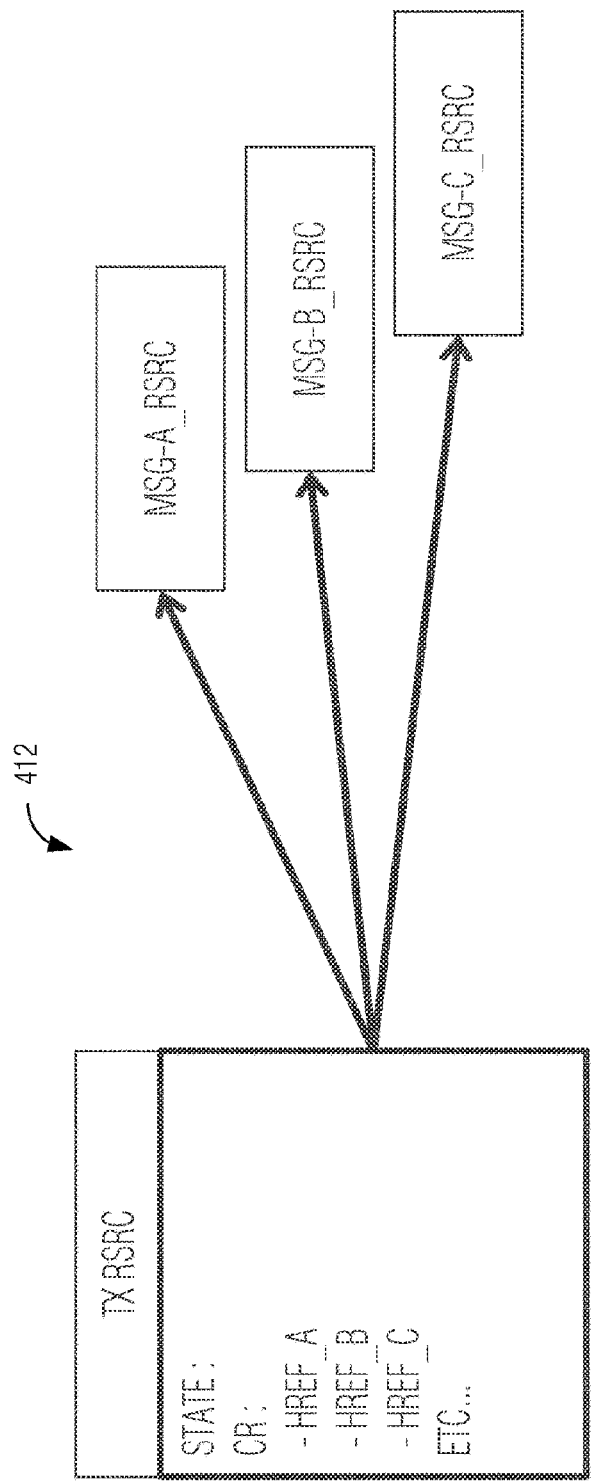
FIG. 6 is a diagram illustrating a transaction message collection according to an example.

FIG. 6 is a diagram illustrating transaction message collection 422 according to an example. As depicted, the transaction resource TX RSRC contains a collection property comprising a list of message resources MSG-A_RSRC=MSG-C_RSRC that describe the objects to be exchanged during the course of the transaction.

Figure 7:
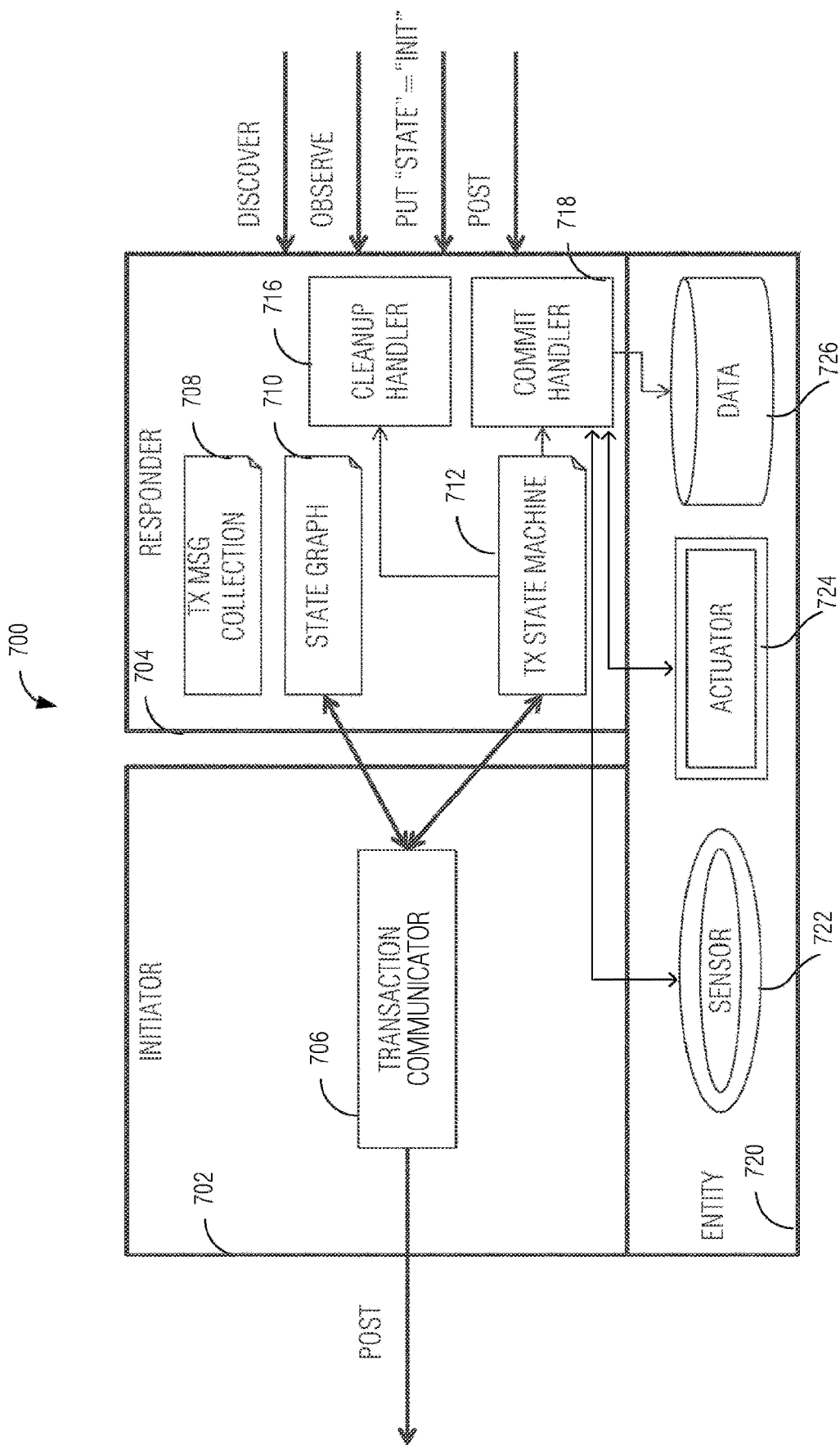
FIG. 7 is a block diagram illustrating the transaction resources of an IoT device according to an embodiment utilizing an IoT framework such as OCF/IoTivity.

FIG. 7 is a block diagram illustrating the transaction resources of an IoT device according to an embodiment utilizing an IoT framework such as OCF/IoTivity. In this example, device 700 is shown with transaction resources provisions for initiator role 702, and for responder role 704. As described above, the initiator and responder roles may be performed by the same device, often times in alternating fashion, during transaction communications and message processing. To carry out initiator role 702, transaction communicator 706 is provided. Transaction communicator 706 performs posting of messages directed to the transaction communicator of a peer device (which would be configured as a responder role to receive the posted messages). Transaction communicator 706 is informed by state graph 710, which represents the proper sequence of states throughout the course of the transaction, and transaction state machine 712, which represents the current state. The state graph 710 indicates the action (e.g., message type) to be sent by transaction communicator 706; whereas transaction state machine 712 indicates when, or whether, the action is to be taken.

Also instantiated in the responder role 704 are transaction message collection 708, which contains the set of messages associated with the transactions supported by device 700, cleanup handler 716, and commit handler 718. The transaction resources of responder role 704 receive and respond to various messages. In the example depicted, DISCOVER, OBSERVE, PUT, and POST messages may be received and processed. As shown, device 700 may be externally programmed to operate in its initiator role to start a transaction.

The transaction resources access entity 720 may include sensor 722, actuator 724, and data store 726. As illustrated, the transaction resources access the resources of entity 720 via commit handler 718, which exercises the responsibility of calling for a persistent state change of device 700.

Figure 8:
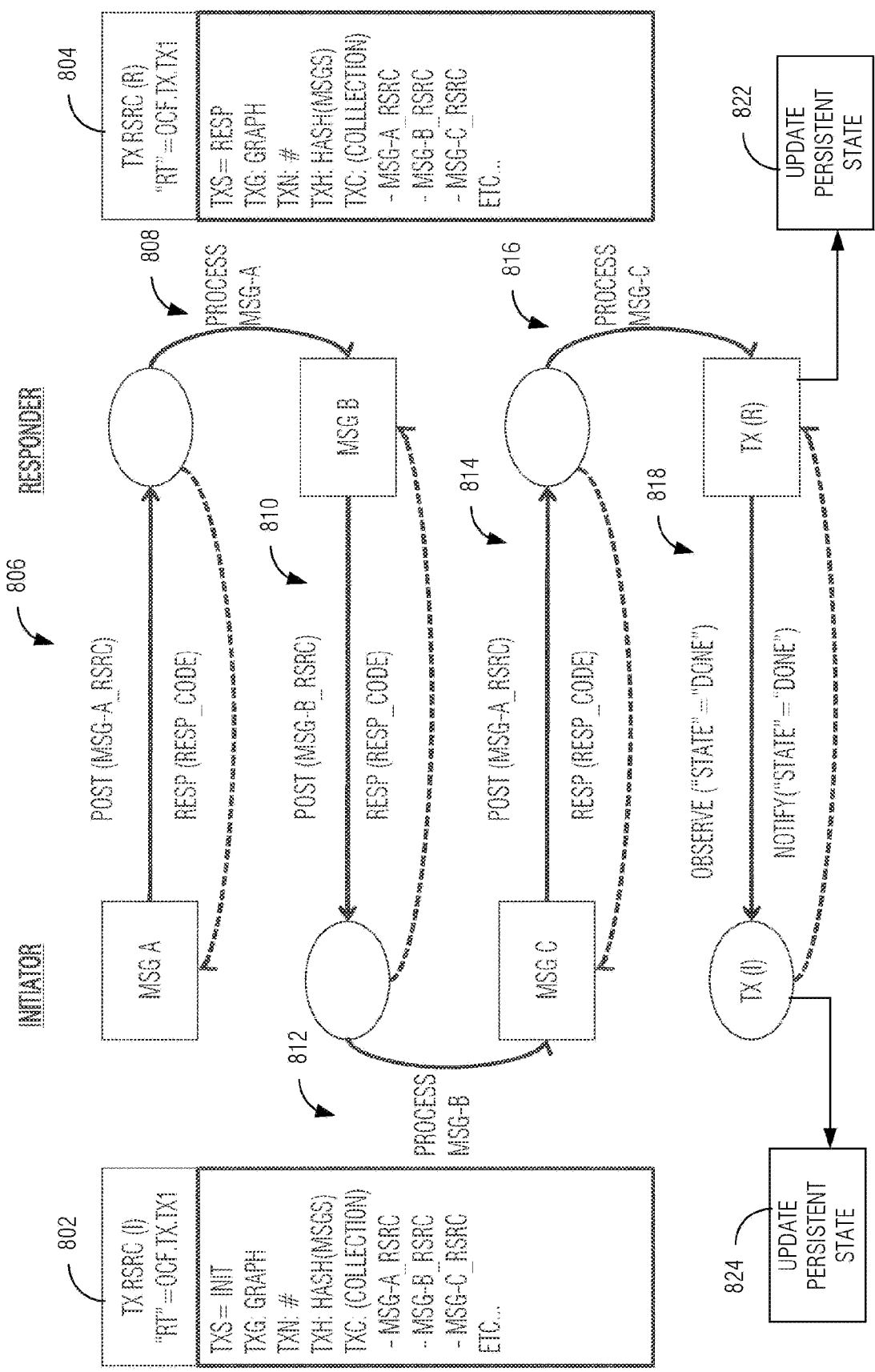
FIG. 8 is a flow diagram illustrating the progress of an example transaction between two IoT devices, each utilizing its respective transaction resources.

FIG. 8 is a flow diagram illustrating the progress of an example transaction between two IoT devices, each utilizing its respective transaction resources. As depicted, the initiator device has transaction resources 802, and the responder device has transaction resources 804 which correspond to transaction resources 802. In this example, the fact that the initiator and responder devices have matching transaction resources is a precondition for their ability to carry out the transaction. In a related embodiment, the initiator device may have previously used a supported discovery or inquiry protocol to check whether the responder device possesses the resources needed for the transaction.

The transaction starts with the initiator device posting the message A resource MSG-A RSRC at 806. The responder responds with a response code RESP CODE, and processes message A at 808. At 810, the responder posts message B, to which the initiator responds with a response code RESP CODE. At 812, the initiator devices processes message B. Thereafter, in accordance with the transaction's predefined protocol, the initiator posts message C at 814, to which the responder device responds with the response code, and processes received message C at 816.

Messages A-C in this example are RESTful message exchanges controlled by a state property that ensures the transaction progresses in a predefined way. The response codes sent by each recipient of a message in turn are indicative of the forward progress of the transaction protocol. In the absence of receipt of a response code, the transmitting device may retry after a period of time, or abort the transaction after some number of retry failures, for example.

Once processing of message C is complete, the responder device may perform an OBSERVE operation at 818 to check for the completion state, DONE. The initiator device in this case provides a DONE state notification observable by the responder device. In response to the successful completion of the transaction, each device may update its persistent state to reflect completion of the transaction. Accordingly, at 822, the responder device commits the transaction by updating its persistent state. Likewise, at 824, the initiator device commits the transaction by updating its persistent state accordingly. In the event of a failure of the transaction, no persistent state change is made in either device.

Figure 9:
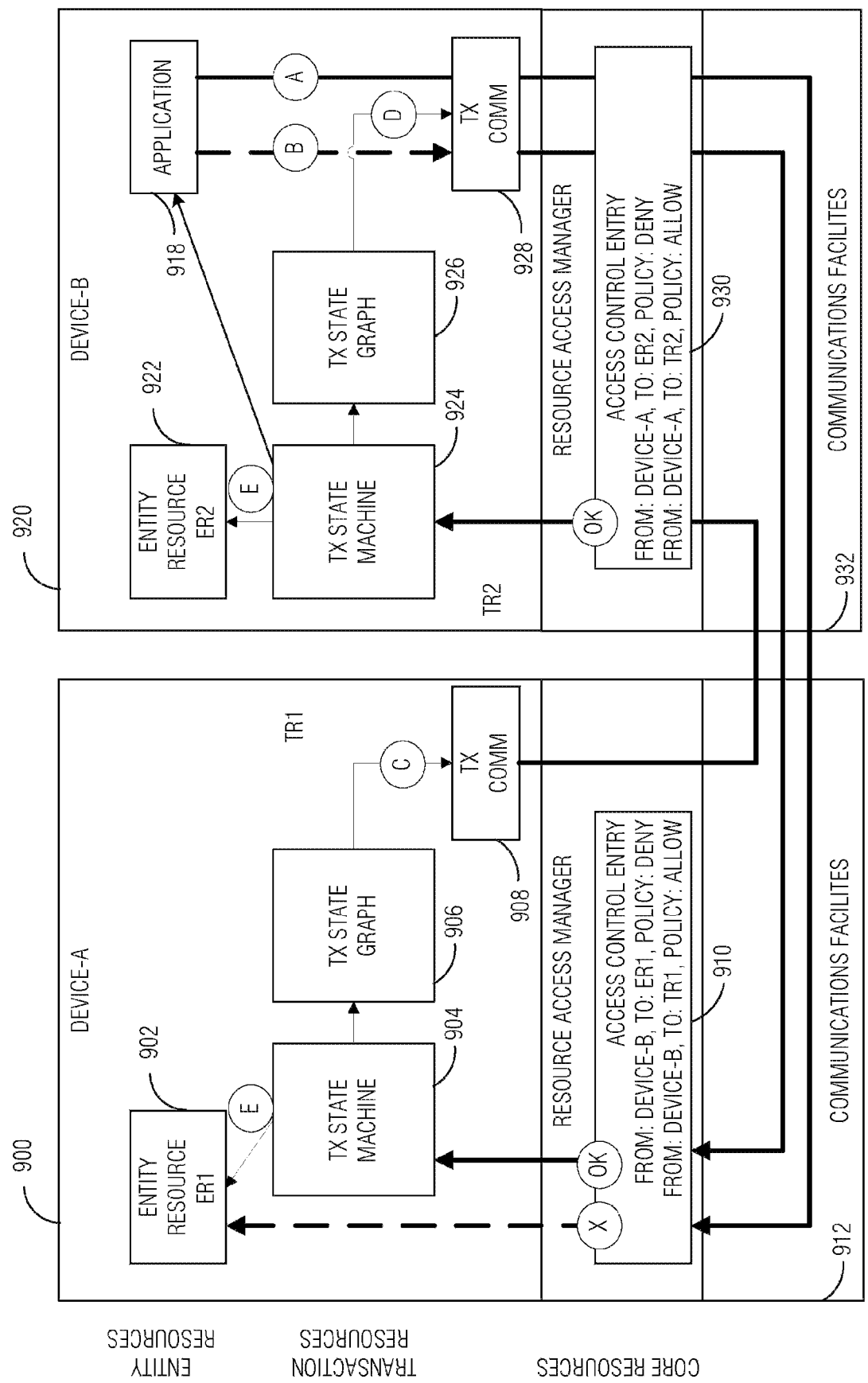
FIG. 9 is a system architecture and data flow diagram illustrating example interactivity between a pair of IoT devices utilizing principles of some embodiments.

FIG. 9 is a system architecture and data flow diagram illustrating example interactivity between a pair of IoT devices utilizing principles of some embodiments. Device A 900 and Device B 920 are respectively configured with entity resources ER1 902 and ER2 922, and transaction resources TR1 and TR2, including respective transaction state machines 904 and 924, transaction state graphs 906 and 926, and transaction communicators 908 and 928. Core resources of the devices include resource access manager 910 for device A 900, and resource access manager 930 for device B 920. Each device also includes communications facilities, as indicated respectively at 912 and 932. In the example illustrated, device B 920 also includes application 918, which in the following operational use case initiates a transaction to access entity resource ER1 902.

As indicated, resource access manager 910 includes an access control entry that denies direct access to entity resource ER1 902 from device B 920, but allows device B 920 to access transaction resources TR1. Accordingly, in operation, interaction A directed from application 918 to entity resource ER1 902 is blocked by resource access manager 910.

However, interaction B, originating at application 918 and directed to transaction resources TR1 of device A 900, is permitted by resource access manager 910. Interaction B may be a DISCOVER request, for instance, that explores whether device A 900 or, more particularly, whether transaction resources TR1 contain a matching transaction configuration (e.g., message collection, state graph) to the transaction intended by device B. In response to device A having a suitable set of transaction resources, transaction resources TR1 and TR2, via transaction communicators 908 and 928 respectively, exchange messages according to TX state graphs 906 and 926. Transaction state machines 904 and 924 advance through their configured finite-state automata in interactions C and D, which may include different messages in the appropriate sequence. Transaction state machines 904 and 924 maintain ephemeral states within the confines of the current transaction. At the successful conclusion of the transaction, the entity resource ER1 902 is updated at E to institute a persistent state change to commit the transaction. If the transaction were to fail, no persistent state change at E would be instituted.

According to another embodiment, multiple IoT devices with transaction resources are configured to implement a workflow process that has distributed sequencing control. A workflow process orchestration engine configured as part of the transaction resources describes a workflow process model, and then partitions the model according to the respective node devices such that the workflow operations between any two workflow neighbors forms a transaction. A workflow node maintains two instances of a transaction resource such that the results of an A-to-B transaction may feed a B-to-C transaction, for example.

According to a related embodiment, the transaction resource includes a template that defines a second resource as a derived type of the transaction resource such that a resource type of the second resource is contained in the resource type value of the transaction resource. For example if the transaction resource has a type designation of "rt"="ocf.r.tx" then a second derived resource (dr) type may be designated by "rt"="ocf.r.tx.dr".

In an example, the semantics of template derivation are such that all the properties defined by the template are available to the derived resource as if they were originally defined by the derived resource. This approach may differ from a first resource referencing a second resource in that the realization of a template resource has a single resource instance, whereas a first resource referencing a second resource will have two resource instances.

Resource template semantics may further be defined to have property overloading such that if a derived resource defines a property named the same as a property named by the template resource. The data structure defined by the template may be hidden from the initiator device seeking to introspect the derived resource. Nevertheless, the derived resource may reference the template defined property using a localized reference. (E.g. if the template resource defines a property "txl" and the derived resource also defines a property "txl" a local reference may be constructed using name mangling such that the resource name is pre-pended to the property name; e.g., "tx_txl". The mangled property has CRUDN permissions of " " such that only local references may be constructed, for instance.

Advantageously, in overloading of the property name the temporality of the property may be variable. This may allow the hidden property value to remain unchanged (e.g., its state may persist while a new state is being negotiated by the transaction protocol). When the protocol commits, or rollsback the new state may be established quickly. This facilitates safer operation.

Property overloading also offers certain security and privacy benefits where a sensitive property value may be hidden during an exchange that may result in a decision not to disclose the hidden property value. Hence, the sensitive value is not at risk of disclosure during the negotiation phase. A security policy may require substitution with a less sensitive value until the FSA commits.

ADDITIONAL NOTES & EXAMPLES

Example 1 is a communications device, comprising: a computing platform, including a processor, a data store, and communication facilities; an entity resource to originate or consume data; core resources to facilitate stateless messaging with a remote device associated with the entity resource; and transaction resources to manage a transaction with the remote device that includes a sequence of messages associated with the entity resource, including: a transaction state machine to represent a current intra-transactional ephemeral state from among a plurality of intra-transactional ephemeral states representing progression of the transaction; a commit handler to institute a persistent state change related to the entity resource in response to a successful completion of the transaction; and a transaction communicator to conduct intra-transaction communications via the core resources directed to corresponding transactional resources of the remote device.

In Example 2, the subject matter of Example 1 optionally includes wherein the device is an Internet-of-Things (IoT) device.

In Example 3, the subject matter of any one or more of Examples 1-2 optionally include In Example 4, the subject matter of any one or more of Examples 1-3 optionally include wherein the stateless messaging includes RESTful messaging.

In Example 5, the subject matter of any one or more of Examples 1-4 optionally include a cleanup handler to abort the transaction and remove any remaining ephemeral state indicia in response to a failure of the transaction.

In Example 6, the subject matter of any one or more of Examples 1-5 optionally include wherein the core resources include a set of defined resources to enable functional interactions selected from the group consisting of: resource discovery, device management, GET operation, PUT operation, OBSERVE operation, or any combination thereof.

In Example 7, the subject matter of any one or more of Examples 1-6 optionally include wherein the core resources include a resource access manager to implement security a policy that limits direct access to the entity resource but permits access to the entity resource via the transaction resources.

In Example 8, the subject matter of any one or more of Examples 1-7 optionally include wherein the transaction resources include a state graph data structure that represents a process flow of the transaction as a sequence of the ephemeral states.

In Example 9, the subject matter of Example 8 optionally includes wherein the state graph data structure is discoverable by the remote device.

In Example 10, the subject matter of any one or more of Examples 1-9 optionally include wherein the transaction resources include a collection resource that represents transaction message resources associated with the transaction.

In Example 11, the subject matter of Example 10 optionally includes wherein the collection resource is discoverable by the remote device.

In Example 12, the subject matter of any one or more of Examples 1-11 optionally include wherein the entity resource includes an application resource to initiate the transaction and to undergo a persistent state change in response to successful completion of the transaction.

In Example 13, the subject matter of any one or more of Examples 1-12 optionally include wherein the entity resource includes at least one data source selected from the group consisting of: a sensor, an actuator, a data store.

Example 14 is a method for operating a communications device, the method comprising: interfacing with an entity resource that originates or consumes data; communicating stateless messaging with a remote device, the stateless messaging being associated with the entity resource; and managing a transaction with the remote device, the transaction including a sequence of messages associated with the entity resource, wherein the managing of the transaction includes: representing a current intra-transactional ephemeral state from among a plurality of intra-transactional ephemeral states representing progression of the transaction; instituting a persistent state change related to the entity resource in response to a successful completion of the transaction; and conducting intra-transaction communications via the core resources directed to corresponding transactional resources of the remote device.

In Example 15, the subject matter of Example 14 optionally includes wherein the communications device is an Internet-of-Things (IoT) device.

In Example 16, the subject matter of any one or more of Examples 14-15 optionally include In Example 17, the subject matter of any one or more of Examples 14-16 optionally include wherein the stateless messaging includes RESTful messaging.

In Example 18, the subject matter of any one or more of Examples 14-17 optionally include aborting the transaction and removing any remaining ephemeral state indicia in response to a failure of the transaction.

In Example 19, the subject matter of any one or more of Examples 14-18 optionally include wherein the stateless messaging facilitates functional interactions selected from the group consisting of: resource discovery, device management, GET operation, PUT operation, OBSERVE operation, or any combination thereof.

In Example 20, the subject matter of any one or more of Examples 14-19 optionally include implementing a security a policy that limits direct access to the entity resource but permits access to the entity resource via the transaction resources.

In Example 21, the subject matter of any one or more of Examples 14-20 optionally include wherein managing the transaction includes storing a state graph data structure that represents a process flow of the transaction as a sequence of the ephemeral states.

In Example 22, the subject matter of Example 21 optionally includes wherein the state graph data structure is discoverable by the remote device.

In Example 23, the subject matter of any one or more of Examples 14-22 optionally include wherein managing the transaction includes storing a collection resource that represents transaction message resources associated with the transaction.

In Example 24, the subject matter of Example 23 optionally includes wherein the collection resource is discoverable by the remote device.

In Example 25, the subject matter of any one or more of Examples 14-24 optionally include wherein the entity resource includes an application resource to initiate the transaction and to undergo a persistent state change in response to successful completion of the transaction.

In Example 26, the subject matter of any one or more of Examples 14-25 optionally include wherein the entity resource includes at least one data source selected from the group consisting of: a sensor, an actuator, a data store.

Example 27 is at least one machine-readable medium containing instructions that, when executed on a communications device, cause the communications device to carry out the method according to any one of Examples 14-27.

Example 28 is a communications system device comprising means for carrying out the method according to any one of Examples 14-27.

Example 29 is at least one machine-readable medium comprising instructions that, when executed on a computing platform of a communications device, cause the communications device to perform operations including: interfacing with an entity resource that originates or consumes data; communicating stateless messaging with a remote device, the stateless messaging being associated with the entity resource; and managing a transaction with the remote device, the transaction including a sequence of messages associated with the entity resource, wherein the managing of the transaction includes: representing a current intra-transactional ephemeral state from among a plurality of intra-transactional ephemeral states representing progression of the transaction; instituting a persistent state change related to the entity resource in response to a successful completion of the transaction; and conducting intra-transaction communications via the core resources directed to corresponding transactional resources of the remote device.

In Example 30, the subject matter of Example 29 optionally includes wherein the communications device is an Internet-of-Things (IoT) device.

In Example 31, the subject matter of any one or more of Examples 29-30 optionally include In Example 32, the subject matter of any one or more of Examples 29-31 optionally include wherein the stateless messaging includes RESTful messaging.

In Example 33, the subject matter of any one or more of Examples 29-32 optionally include instructions for causing the communications device to abort the transaction and remove any remaining ephemeral state indicia in response to a failure of the transaction.

In Example 34, the subject matter of any one or more of Examples 29-33 optionally include wherein the stateless messaging facilitates functional interactions selected from the group consisting of: resource discovery, device management, GET operation, PUT operation, OBSERVE operation, or any combination thereof.

In Example 35, the subject matter of any one or more of Examples 29-34 optionally include instructions for implementing a security a policy that limits direct access to the entity resource but permits access to the entity resource via the transaction resources.

In Example 36, the subject matter of any one or more of Examples 29-35 optionally include wherein managing the transaction includes storing a state graph data structure that represents a process flow of the transaction as a sequence of the ephemeral states.

In Example 37, the subject matter of Example 36 optionally includes wherein the state graph data structure is discoverable by the remote device.

In Example 38, the subject matter of any one or more of Examples 29-37 optionally include wherein managing the transaction includes storing a collection resource that represents transaction message resources associated with the transaction.

In Example 39, the subject matter of Example 38 optionally includes wherein the collection resource is discoverable by the remote device.

In Example 40, the subject matter of any one or more of Examples 29-39 optionally include wherein the entity resource includes an application resource to initiate the transaction and to undergo a persistent state change in response to successful completion of the transaction.

In Example 41, the subject matter of any one or more of Examples 29-40 optionally include wherein the entity resource includes at least one data source selected from the group consisting of: a sensor, an actuator, a data store.

Example 42 is a system for a communications device, the system comprising: means for interfacing with an entity resource that originates or consumes data; means for communicating stateless messaging with a remote device, the stateless messaging being associated with the entity resource; and means for managing a transaction with the remote device, the transaction including a sequence of messages associated with the entity resource, wherein the means for managing of the transaction include: means for representing a current intra-transactional ephemeral state from among a plurality of intra-transactional ephemeral states representing progression of the transaction; means for instituting a persistent state change related to the entity resource in response to a successful completion of the transaction; and means for conducting intra-transaction communications via the core resources directed to corresponding transactional resources of the remote device.

In Example 43, the subject matter of Example 42 optionally includes wherein the communications device is an Internet-of-Things (IoT) device.

In Example 44, the subject matter of any one or more of Examples 42-43 optionally include In Example 45, the subject matter of any one or more of Examples 42-44 optionally include wherein the stateless messaging includes RESTful messaging.

In Example 46, the subject matter of any one or more of Examples 42-45 optionally include means for aborting the transaction and removing any remaining ephemeral state indicia in response to a failure of the transaction.

In Example 47, the subject matter of any one or more of Examples 42-46 optionally include wherein the stateless messaging facilitates functional interactions selected from the group consisting of: resource discovery, device management, GET operation, PUT operation, OBSERVE operation, or any combination thereof.

In Example 48, the subject matter of any one or more of Examples 42-47 optionally include means for implementing a security a policy that limits direct access to the entity resource but permits access to the entity resource via the transaction resources.

In Example 49, the subject matter of any one or more of Examples 42-48 optionally include wherein the means for managing the transaction include means for storing a state graph data structure that represents a process flow of the transaction as a sequence of the ephemeral states.

In Example 50, the subject matter of Example 49 optionally includes wherein the state graph data structure is discoverable by the remote device.

In Example 51, the subject matter of any one or more of Examples 42-50 optionally include wherein the means for managing the transaction include means for storing a collection resource that represents transaction message resources associated with the transaction.

In Example 52, the subject matter of Example 51 optionally includes wherein the collection resource is discoverable by the remote device.

In Example 53, the subject matter of any one or more of Examples 42-52 optionally include wherein the entity resource includes an application resource to initiate the transaction and to undergo a persistent state change in response to successful completion of the transaction.

In Example 54, the subject matter of any one or more of Examples 42-53 optionally include wherein the entity resource includes at least one data source selected from the group consisting of: a sensor, an actuator, a data store.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A communications device, comprising:
    a computing platform, including a processor, a data store, and communication facilities, the computing platform to implement:
        an entity resource to originate or consume data;
        core resources to facilitate stateless messaging with a remote device, the stateless messaging including operations for data associated with the entity resource; and
        transaction resources to interface with the entity resource and manage a transaction with the remote device that includes a sequence of stateless messages associated with the entity resource, wherein the transaction resources provide abstraction to limit direct communication with the entity resource for the transaction, the transaction resources including:
            a transaction state machine to represent a current intra-transactional ephemeral state from among a plurality of intra-transactional ephemeral states representing progression of the sequence of stateless messages for the transaction;
            a commit handler to institute a persistent state change related to the entity resource in response to a successful completion of the transaction; and
            a transaction communicator to conduct intra-transaction communications via the core resources directed to corresponding transactional resources of the remote device.

2. The communications device of claim 1, wherein the device is an Internet-of-Things (IoT) device.

3. The communications device of claim 1, wherein the device is compliant with the Open Connectivity Foundation (OCF).

4. The communications device of claim 1, wherein the stateless messaging includes RESTful messaging.

5. The communications device of claim 1, further comprising a cleanup handler to abort the transaction and remove any remaining ephemeral state indicia in response to a failure of the transaction.

6. The communications device of claim 1, wherein the core resources include a set of defined resources to enable functional interactions selected from the group consisting of: resource discovery, device management, GET operation, PUT operation, OBSERVE operation, or any combination thereof.

7. The communications device of claim 1, wherein the core resources include a resource access manager to implement security a policy that limits direct access to the entity resource but permits access to the entity resource via the transaction resources.

8. The communications device of claim 1, wherein the transaction resources include a state graph data structure that represents a process flow of the transaction as a sequence of the ephemeral states.

9. The communications device of claim 8, wherein the state graph data structure is discoverable by the remote device.

10. The communications device of claim 1, wherein the transaction resources include a collection resource that represents transaction message resources associated with the transaction.

11. The communications device of claim 10, wherein the collection resource is discoverable by the remote device.

12. The communications device of claim 1, wherein the entity resource includes an application resource to initiate the transaction and to undergo a persistent state change in response to successful completion of the transaction.

13. The communications device of claim 1, wherein the entity resource includes at least one data source selected from the group consisting of: a sensor, an actuator, a data store.

14. A method for operating a communications device, the method comprising:
    interfacing with an entity resource that originates or consumes data;
    communicating stateless messaging with a remote device, the stateless messaging including operations operations for data associated with the entity resource; and
    managing a transaction with the remote device, the transaction including a sequence of stateless messages associated with the entity resource, wherein managing the transaction uses abstraction to limit direct communication with the entity resource for the transaction and wherein the managing of the transaction includes:
        interfacing with the entity resource based on the sequence of stateless messages;
        representing a current intra-transactional ephemeral state from among a plurality of intra-transactional ephemeral states representing progression of the sequence of stateless messages for the transaction;
        instituting a persistent state change related to the entity resource in response to a successful completion of the transaction; and conducting intra-transaction communications via the core resources directed to corresponding transactional resources of the remote device.

15. The method of claim 14, wherein the stateless messaging includes RESTful messaging.

16. The method of claim 14, further comprising: aborting the transaction and removing any remaining ephemeral state indicia in response to a failure of the transaction.

17. The method of claim 14, wherein the stateless messaging facilitates functional interactions selected from the group consisting of: resource discovery, device management, GET operation, PUT operation, OBSERVE operation, or any combination thereof.

18. The method of claim 14, further comprising:
implementing a security a policy that limits direct access to the entity resource but permits access to the entity resource via the transaction resources.

19. The method of claim 14, wherein managing the transaction includes storing a state graph data structure that represents a process flow of the transaction as a sequence of the ephemeral states.

20. The method of claim 19, wherein the state graph data structure is discoverable by the remote device.

21. The method of claim 14, wherein managing the transaction includes storing a collection resource that represents transaction message resources associated with the transaction.

22. The method of claim 21, wherein the collection resource is discoverable by the remote device.

23. At least one machine-readable medium comprising instructions that, when executed on a computing platform of a communications device, cause the communications device to perform operations including:
interfacing with an entity resource that originates or consumes data;
communicating stateless messaging with a remote device, the stateless messaging including operations for data associated with the entity resource; and
managing a transaction with the remote device, the transaction including a sequence of stateless messages associated with the entity resource, wherein managing the transaction uses abstraction to limit direct communication with the entity resource for the transaction and wherein the managing of the transaction includes:
  interfacing with the entity resource based on the sequence of messages;
  representing a current intra-transactional ephemeral state from among a plurality of intra-transactional ephemeral states representing progression of the sequence of stateless messages for the transaction;
  instituting a persistent state change related to the entity resource in response to a successful completion of the transaction; and
  conducting intra-transaction communications via the core resources directed to corresponding transactional resources of the remote device.

24. The at least one machine-readable medium of claim 23, further comprising: instructions for causing the communications device to abort the transaction and remove any remaining ephemeral state indicia in response to a failure of the transaction.

25. The at least one machine-readable medium of claim 23, wherein the stateless messaging facilitates functional interactions selected from the group consisting of: resource discovery, device management, GET operation, PUT operation, OBSERVE operation, or any combination thereof.

* * * * *

UNITED STATES PATENT AND TRADEMARK OFFICE
CERTIFICATE OF CORRECTION

PATENT NO. : 10,924,555 B2
APPLICATION NO. : 16/473597
DATED : February 16, 2021
INVENTOR(S) : Smith et al.

Page 1 of 1

It is certified that error appears in the above-identified patent and that said Letters Patent is hereby corrected as shown below:

In the Claims

Column 18, Line 51, Claim 14, delete "operations operations" and insert --operations-- therefor Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*